US010033569B1

United States Patent
Singh et al.

(10) Patent No.: US 10,033,569 B1
(45) Date of Patent: Jul. 24, 2018

(54) AUTOMATED SIMPLE NETWORK MANAGEMENT PROTOCOL VARIABLE RESET

(71) Applicant: Juniper Networks, Inc., Sunnyvale, CA (US)

(72) Inventors: Ashish Kumar Singh, Bangalore (IN); Appasaheb Ajit Ghali, Bangalore (IN); Tibin Antony, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 273 days.

(21) Appl. No.: 14/708,874

(22) Filed: May 11, 2015

(51) Int. Cl.
*G06F 15/16* (2006.01)
*H04L 12/24* (2006.01)
*H04L 29/06* (2006.01)

(52) U.S. Cl.
CPC .......... *H04L 41/0213* (2013.01); *H04L 63/08* (2013.01)

(58) Field of Classification Search
CPC ............................. H04L 41/0213; H04L 63/08
USPC .................................................. 709/227, 228
See application file for complete search history.

(56) References Cited

U.S. PATENT DOCUMENTS

| | | | | |
|---|---|---|---|---|
| 5,887,046 A * | 3/1999 | Bromley | ................... | G11C 7/00 377/26 |
| 6,314,532 B1 * | 11/2001 | Daudelin | ............ | G06F 11/1417 714/23 |
| 6,567,826 B1 * | 5/2003 | Fischer | ................ | G06F 11/0706 |
| 7,735,030 B1 * | 6/2010 | Kalil | .................... | G06F 17/5022 703/14 |
| 8,085,787 B1 * | 12/2011 | Monteiro | ................ | H04L 12/66 370/238.1 |
| 2004/0153862 A1 * | 8/2004 | Grellmann | ............... | A61B 8/00 714/43 |
| 2008/0320555 A1 * | 12/2008 | Ciaffi | ...................... | G06F 21/34 726/2 |
| 2009/0006289 A1 * | 1/2009 | Jaros | ...................... | G06N 3/049 706/12 |

(Continued)

OTHER PUBLICATIONS

Harrington et al, "An Architecture for Describing SNMP Management Frameworks," RFC 2571, Network Working Group, The Internet Society, Apr. 1999, 62 pp.

(Continued)

*Primary Examiner* — Phuoc Nguyen
(74) *Attorney, Agent, or Firm* — Shumaker & Sieffert, P.A.

(57) ABSTRACT

An example managed network device includes a control unit and a storage medium that stores a file that includes a variable value. The control unit provides an execution environment for a simple network management protocol (SNMP) engine operable by the control unit to establish, based on a set of authentication parameters, secure SNMP communication with a network management system, determine whether the file is corrupted, determine whether the variable value stored in the file is readable, determine whether the variable value is greater than or equal to a maximum value, and, responsive to determining that the file is corrupted, that the variable value is not readable, or that the variable value is greater than or equal to the maximum value: re-initialize the variable value, notify a network management system, and maintain the secure simple networking management protocol communication with network management system using the set of authentication parameters.

20 Claims, 3 Drawing Sheets

(56) References Cited

U.S. PATENT DOCUMENTS

| | | | | |
|---|---|---|---|---|
| 2013/0238795 A1* | 9/2013 | Geffin | ..................... | G06F 1/206 |
| | | | | 709/224 |
| 2014/0025321 A1* | 1/2014 | Spanier | ................ | G01R 21/133 |
| | | | | 702/62 |
| 2015/0279441 A1* | 10/2015 | Greenberg | ............ | G11C 11/406 |
| | | | | 365/49.1 |

OTHER PUBLICATIONS

Blementhal et al, "User-based Security Model (USM) for version 3 of the Simple Network Management Protocol (SNMPv)," RFC 2574, Network Working Group, The Internet Society, Apr. 1999, 86 pp.

Harrington et al, "An Architecture for Describing Simple Network Management Protocol (SNMP) Management Frameworks," RFC 3411, Network Working Group, The Internet Society, Dec. 2002, 64 pp.

Blumenthal et al, "User- based Security Model (USM) for version 3 of the Simple Network Management Protocol (SNMPv3)," RFC 3414, Network Working Group, The Internet Society, Dec. 2002, 88 pp.

Lewis, "Dynamically changing the SnmpEngineID-Network Snmp Development," Network Discussion Forums, Network NET Snmp Development, Retrieved on Feb. 24, 2015 from http://t58241.network-net-snmp-development.networkforum.info/dynamically-changing-the-snmpengineid-t58241.html, 42 pp.

* cited by examiner

AUTOMATED SIMPLE NETWORK MANAGEMENT PROTOCOL VARIABLE RESET

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the clients may allow a user to view current operating parameters, system logs, information related to network connectivity, network activity or other status information from the devices as well as view and react to event information received from the devices.

The Simple Network Management Protocol (SNMP) is a standard defined by the Internet Engineering Task Force (IETF) for managing network devices. SNMP uses a design that incorporates one or more management information bases (MIBs) within a managed device to describe and expose internal data elements of the managed device. Management devices, such as computer consoles and network management systems, store data to and read data from the SNMP MIBs of the devices to configure, monitor and generally control operation of the devices. For example, an SNMP engine executing on the managed device accesses the device's internal SNMP MIBS and exchanges network management information with an SNMP manager running on the network management system or other host. The SNMP engine responds to requests for information and directives from the SNMP manager.

SUMMARY

Techniques of this disclosure may enable a managed network device to automatically reset and re-establish a management variable in response to detecting a failure condition such that an SNMP engine of the managed network device may provide uninterrupted execution of SNMPv3 queries between a network management system and managed devices. In some examples, the management variable may be used in an SNMP security model, which provides a mechanism to verify the integrity of an SNMP message. One such variable is the snmpEngineBoots variable, which indicates a number of times the SNMP engine has been initialized or re-initialized since a unique identifier for the SNMP engine was last configured.

A managed network device configured in accordance with the techniques of this disclosure includes an SNMP engine executing on the managed network device that monitors an snmpEngineBoots value and file and resets and/or re-establishes the snmpEngineBoots value and/or file in response to detecting a failure condition. The failure conditions may include, but are not limited to, the snmpEngineBoots variable being set to a value greater than 2147483647, the SNMP engine being unable to determine the value of the snmpEngineBoots variable, corruptions of a file that stores the snmpEngineBoots variable value, or an inability for the SNMP engine to access the file that stores the snmpEngineBoots variable. Responsive to detecting the failure condition, the SNMP engine may recreate the file that stores the snmpEngineBoots variable, reset the snmpEngineBoots variable value, write the reset snmpEngineBoots variable value to the file that stores the snmpEngineBoots variable, send a message to a network management system, and log the event.

In this way, techniques of this disclosure may enable the SNMP engine to automatically detect and recover from certain variable failure conditions such that the SNMP engine may provide uninterrupted execution of SNMPv3 queries between a network management system and the managed device on which the SNMP engine is executing. In other words, the managed device and the network management system may establish secure SNMP communication using a set of authentication parameters and, rather than having to re-establish the secure communication using a new set of authentication parameters when the snmpEngineBoots value reaches the maximum value, may maintain secure communication using the same authentication parameters.

In one example, a method includes establishing, by a managed device and based on a set of authentication parameters, secure simple networking management protocol communication with network management system. The method may also include determining, by the managed device, whether a file is corrupted, determining, by the managed device, whether a variable value stored in the file is readable, and determining, by the managed device, whether the variable value is greater than or equal to a maximum value. The method may also include, responsive to determining that the file is corrupted, that the variable value is not readable, or that the variable value is greater than or equal to the maximum value: re-initializing the variable, and maintaining the secure simple networking management protocol communication with network management system using the set of authentication parameters.

In another example, a managed network device includes a storage medium configured to store a file that includes a variable value and a control unit. The control unit provides an execution environment for a simple network management protocol engine. The simple network management protocol engine is operable by the control unit to establish, based on a set of authentication parameters, secure simple networking management protocol communication with a network management system, determine whether the file is corrupted, determine whether the variable value stored in the file is readable, determine whether the variable value is greater than or equal to a maximum value, and, responsive to determining that the file is corrupted, that the variable value is not readable, or that the variable value is greater than or equal to the maximum value: re-initialize the variable value, and maintain the secure simple networking management protocol communication with network management system using the set of authentication parameters.

In another example, a non-transitory computer-readable storage medium is encoded with instructions that cause one or more processors of a managed network device to establish, based on a set of authentication parameters, secure simple networking management protocol communication with a network management system, determine whether a file is corrupted, determine whether a value of an snmpEngineBoots object stored in the file is readable, and determine whether the value of the snmpEngineBoots object is greater than or equal to a maximum value. The instructions further cause the one or more processors to, responsive to determining that the file is corrupted, that the value of the snmpEngineBoots object is not readable, or that the value of the snmpEngineBoots object is greater than or equal to the maximum value: re-initialize the value of the snmpEngineBoots, and maintain the secure simple networking management protocol communication with network management system using the set of authentication parameters.

The details of one or more examples of the techniques of this disclosure are set forth in the accompanying drawings and the description below. Other features, objects, and advantages will be apparent from the description and drawings, and from the claims.

DETAILED DESCRIPTION

Figure 1:
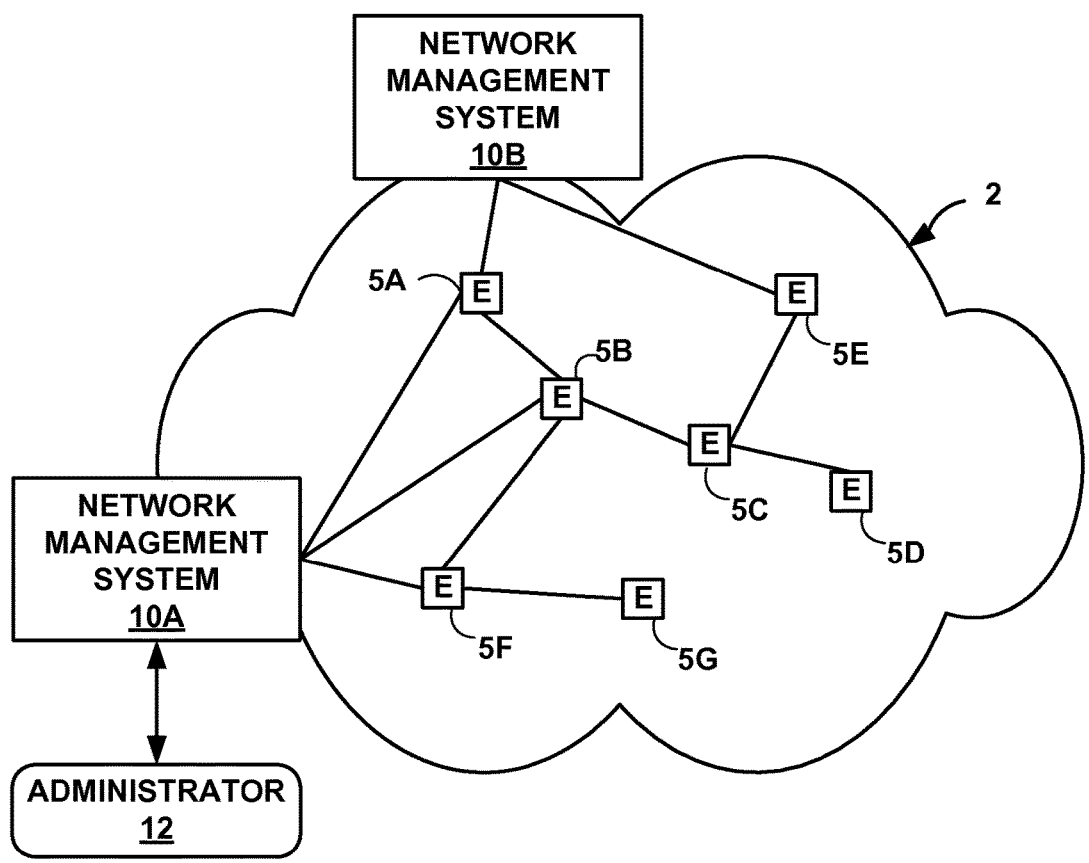
FIG. 1 is a block diagram illustrating elements of an example network that provides value recoveries and notifications in accordance with one or more aspects of this disclosure.

FIG. 1 is a block diagram illustrating elements of an example network that provides value recoveries and notifications in accordance with one or more aspects of this disclosure. Even though two network management systems (NMS) 10A and 10B (collectively, "network management systems 10") are illustrated in FIG. 1, any number of network management systems 10 may be used to manage elements of enterprise network 2. Managed devices 5A-5G (collectively, "managed devices 5") of enterprise network 2 include network devices interconnected via communication links to form a communication topology in order to exchange resources and information. Even though seven managed devices 5 are illustrated in FIG. 1, any number of managed devices 5 may be included in enterprise network 2. Managed devices 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Enterprise network 2 supports the exchange of protocol data units (PDUs) for transmitting data among managed devices 5 and network management systems 10. Such PDUs may comprise, for example, Internet Protocol (IP) packets Ethernet datagrams, and Asynchronous Transfer Mode (ATM) cells. Communication links interconnecting managed devices 5 may be physical links (e.g., optical, copper, and the like) or wireless.

Enterprise network 2 may represent an enterprise network, a campus network, a service provider network, or other autonomous system for example. Thus, while described with respect to an enterprise network, the techniques of this disclosure are applicable to other network types, public and private, including local area networks (LANs), virtual local area networks (VLANs), virtual private networks (VPNs), and the like. Enterprise network 2 may be coupled to one or more additional private or public networks, e.g., the Internet (not shown).

Network management systems 10 are communicatively coupled to managed devices 5 via enterprise network 2. Network management systems 10 may be coupled either directly or indirectly to the various managed devices 5. Once managed devices 5 are deployed and activated, administrator 12 may use network management systems 10 to manage the managed devices 5 using a management protocol designed for management of configuration data within managed devices 5, such as the Simple Network Management Protocol (SNMP), or the Network Configuration (NETCONF) protocol, or a derivative thereof, such as the Juniper Device Management Interface, to perform the configuration.

In common practice, network management systems 10 and managed devices 5 managed by network management systems 10 are centrally maintained by an IT group of the enterprise. Administrator 12 interacts with one or more of network management systems 10 to remotely monitor and configure managed devices 5. For example, administrator 12 may receive alerts from network management system 10A regarding any of managed devices 5, view configuration data of managed devices 5, modify the respective configuration data of managed devices 5, add new network devices to network 2, remove existing network devices from network 2, or otherwise manipulate the network 2 and network devices therein.

Administrator 12 uses network management systems 10 to configure managed devices 5 to specify certain operational characteristics that further the objectives of administrator 12. For example, administrator 12 may specify for a managed device 5 a particular operational policy regarding security, device accessibility, traffic engineering, quality of service (QoS), network address translation (NAT), packet filtering, packet forwarding, rate limiting, or other policies. Network management systems 10 use a network management protocol, such as SNMP, designed for management of configuration data within network devices or monitoring and retrieving operation data from managed devices 5.

SNMP allows network management systems 10 to traverse and modify management information bases (MIBs) within each of devices 5 that describe the structure of the management data of the device by using a namespace that contains object identifiers (OIDs). Each OID represents, within the particular managed device 5, a managed object that identifies a specific characteristic about the managed device. Managed objects include one or more object instances, also represented by an OID in a MIB, that each identifies a variable of management data (e.g., a operational/configuration parameter) within the network device that can be read or set by the client via SNMP. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which is incorporated herein by reference.

Network management systems 10 may issue commands in accordance with the network management protocol to monitor or control managed network devices 5 (e.g., SNMP GetRequest, GetNextRequest, Walk, or SetRequest commands). In an example operation, network management system 10A issues a command to direct an SNMP engine executing on one of devices 5 (e.g., device 5A) to retrieve a set of management information. The management information may include configuration and/or operational information. The command includes a request identifier that uniquely identifies that particular request associated with the command. Device 5A receives the request for the set of management information in the form of variable bindings ("varbinds"). The varbinds include a set of name-value pairs of management objects, where the name is the object identifier (OID). The SNMP engine executing on device 5A retrieves values for the set of requested OIDs and returns the OIDs and values in one or more response protocol data units (PDUs). That is, the SNMP engine uses the OIDs to select object instances within the MIB, where each of the object instances is bound to a variable (e.g., a configurable parameter or status data unit) within the internal data space of the control software executing on the network device. In this way, the SNMP engine utilizes the structures in the MIB to allow network management system 10A to read or set any of the specific data elements of the internal data space that are described by the MIB and thereby exposed to the SNMP engine by way of the MIB.

SNMP version 3 (SNMPv3) includes a user-based security model that provides SNMP message security. That is, SNMPv3 provides a mechanism by which network management systems 10 and managed devices 5 may verify the integrity of SNMP messages exchanged between network management systems 10 and managed devices 5. Further details regarding the SNMPv3 user-based security model can be found in Blumenthal et al., RFC 2574, "User-based Security Model (USM) for version 3 of the Simple Network Management Protocol (SNMPv3)," Network Working Group, April 1199, available at http://tools.ietf.org/html/rfc2574, and in Blumenthal et al., RFC 3414, "User-based Security Model (USM) for version 3 of the Simple Network Management Protocol (SNMPv3)," Network Working Group, December 2002, the entire contents of each of which is incorporated herein by reference.

In implementing the user-based security model SNMPv3 utilizes various variables to protect again packet replay. Packet replay occurs when a particular packet is sent multiple times to a particular device. The particular packet may be a valid SNMP message and may be applied by the receiving device (e.g., managed device 5A) the first time managed device 5A receives the packet. However, without replay protection, managed device 5A would continue to apply the packet each time managed device 5A received the packet. With replay protection, managed device 5A determines that managed device 5A already received the particular packet and discards subsequent copies of the same packet even though the packet is otherwise valid.

Replay protection as implemented in SNMPv3 and as set forth in RFC 3414 relies upon three objects: an snmpEngineID object, an snmpEngineBoots object, and an snmpEngineTime object. While described as "objects," these objects may also be referred to as "variables" and the terms "objects" and "variables" are intended to be interchangeable such that an "snmpEngineID object" and an "snmpEngineID variable" are intended to refer to the same thing. The snmpEngineID object uniquely and unambiguously identifies the respective SNMP engine executing on each managed device 5. The snmpEngineBoots object value indicates a number of times that the SNMP engine has re-booted/re-initialized itself since snmpEngineID was last configured (e.g., by administrator 12). Lastly, the snmpEngineTime object value indicates a number of seconds that have elapsed since the value of the snmpEngineBoots object was last incremented.

The SNMP engine of each of managed devices 5 is required to maintain the values of its snmpEngineID and snmpEngineBoots objects in non-volatile storage such as a file. However, the file or the snmpEngineBoots object value stored in the file may corrupt. Due to the corruption, the snmpEngineBoots value becomes invalid or set to an out of range value, such as 4294958632. As set forth on RFC 2574, when snmpEngineBoots value becomes greater than or equal to 2147483647, snmpEngineBoots stays at that value and authentication fails for otherwise authenticated messages (i.e., because the time window used for replay protection is invalid). Due to this, SNMPv3 queries (e.g., SNMP polling between network management system 10A and managed device 5A) stops. According to RFCs 2574 and 3414, manual intervention is required in order to reset an SNMP engine whose snmpEngineBoots value has reached the value 2147483647. That is, according to RFCs 2574 and 3414, the SNMP engine must be physically visited and re-configured, either with a new snmpEngineID value or with new secret values for the authentication and privacy protocols of all users known to that SNMP engine.

Rather than requiring manual intervention, techniques of this disclosure provide an automated recovery mechanism for at least three scenarios that may cause query failures. That is, techniques of this disclosure may enable an SNMP engine automatically recovers from at least three scenarios in which the snmpEngineBoots object may cause query failures. First, an SNMP engine may be configured to handle query failures that occur when the value of the snmpEngineBoots object reaches its maximum value (i.e., 2147483647). In this first scenario, an SNMP engine configured in accordance with the techniques of this disclosure determines that the snmpEngineBoots value reached its maximum value, notifies at least one of network management systems 10 that snmpEngineBoots has reached its maximum value, and automatically resets the value of the snmpEngineBoots object to 1. Second, an SNMP engine may be configured to automatically recover from query failures that occur when the SNMP engine is unable to determine the value of snmpEngineBoots object. In this second scenario, the SNMP engine sets the snmpEngineBoots value to 1, notifies at least one of network management systems 10 about this event, and logs this event in a system log. Third, an SNMP engine may be configured to handle query failures that occur when there is corruption of the file that stores the value of the snmpEngineBoots object. In this third scenario, the SNMP engine sets the snmpEngineBoots value to 1, notifies at least one of network management systems 10 about this event, and logs this event in a system log.

While described with respect to SNMPv3 and the snmpEngineBoots object, techniques of this disclosure may be applied to any variable or object that has an error condition. In general, technique of this disclosure may enable a software application to monitor a variable value, identify an error condition (e.g., unable to determine the value of the variable, the value of the variable indicates and error, etc.), and automatically recover from the error by re-initializing or otherwise resetting the variable value.

In this way, techniques of this disclosure may eliminate the currently required manual intervention when snmpEngineBoots reaches a maximum value or cannot be read, which may reduce the overhead of the network administrators. Further, techniques of this disclosure may enable SNMPv3 polling to continue uninterrupted when snmpEngineBoots reaches a maximum value or cannot be read. Automatically resetting and/or reinitializing the snmpEngineBoots value and/or file may also reduce the frequency of notInTimeWindow authentication failures in SNMP queries. Moreover, by promptly sending notifications of the snmpEngineBoots value resets and/or re-initializations to the network management system, network administrators can take recovery actions in a timely manner.

Figure 2:
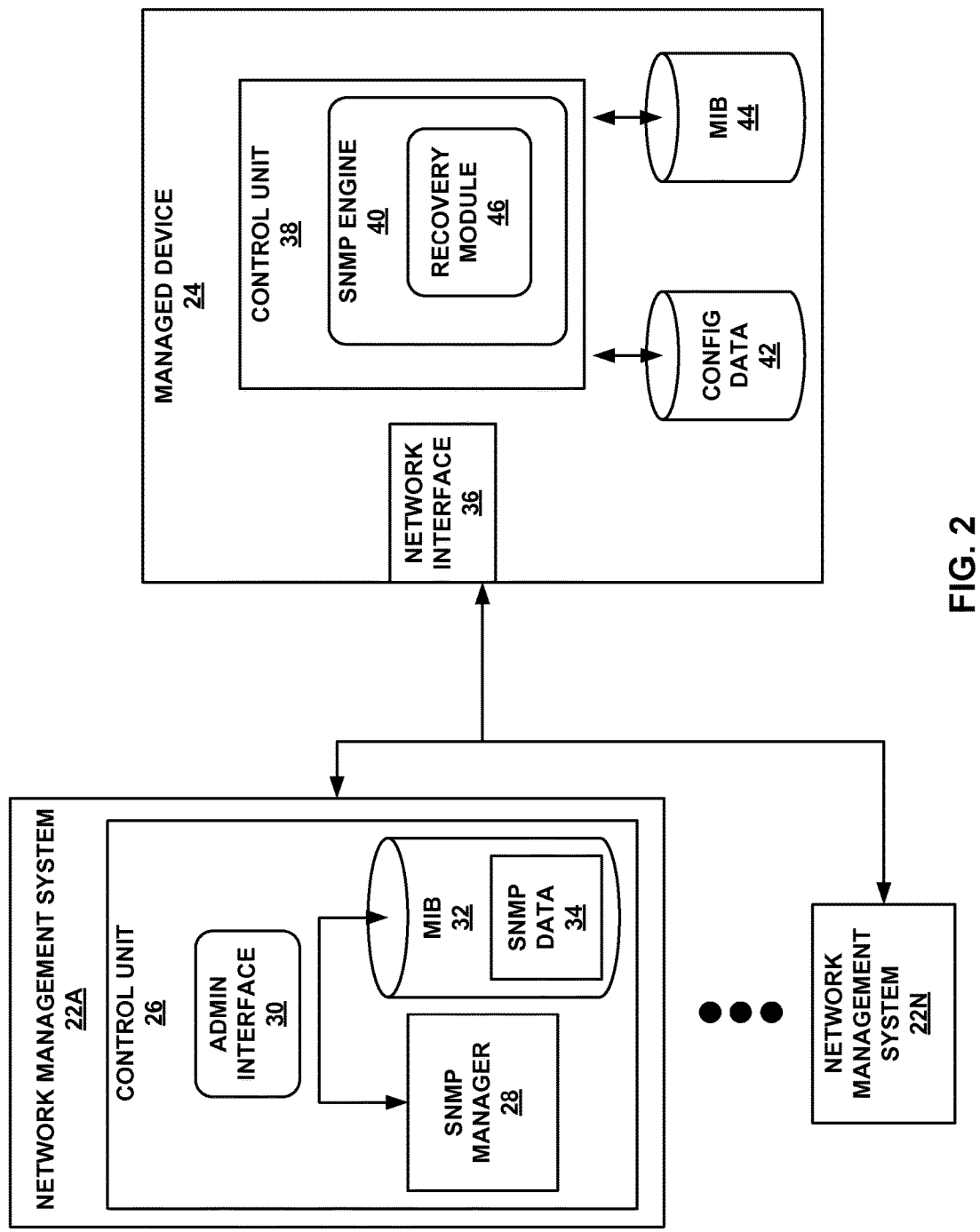
FIG. 2 is a block diagram illustrating an example set of network management devices and an example managed device that automatically recovers from snmpEngineBoots value errors in accordance with one or more aspects of this disclosure.

FIG. 2 is a block diagram illustrating an example set of network management devices and an example managed device that automatically recovers from snmpEngineBoots value errors in accordance with one or more aspects of this disclosure. Network management systems 22A-22N (collectively, "network management systems 22") manage managed device 24 using a management protocol, such as SNMP, for exchanging management protocol messages over a communication link. Network management systems 22 may also be referred to as network management devices in this disclosure. While described with respect to one particular protocol for managing network devices, e.g., SNMP, techniques of this disclosure may apply to any network management protocol by which a management application requests management information from a managed device and by which the managed device respond to the management information request by providing the management application with the requested management information.

Each of network management systems 22A-22N (collectively, "network management systems 22") may be an example of a network management system 10 of FIG. 1 and managed device 24 may be an example of a managed device 5 of FIG. 1. In the example embodiment illustrated in FIG. 2, network management system 22A includes control unit 26 and managed device 24 includes network interface 36 and control unit 38.

Each of control units 26 and 38 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for SNMP manager 28, administrative interface (ADMIN INTERFACE) 30 and management information base (MIB) 32. MIB 32 is a hierarchy of information that specifies managed objects in device 24 managed by SNMP manager 28. MIB 32 includes managed object instances that each represent an aspect of SNMP managed data (SNMP DATA) 34, which may include, for example, configuration or descriptive data for device 24. In some examples, the current configuration of SNMP manager 28 may be contained in SNMP data 34. MIB 32 and SNMP data 34 may each be stored in a data repository and stored in the form of one or more tables, databases, linked lists, radix trees, or other suitable data structure. SNMP manager 28 represents an exemplary instance of an SNMP management application or, more generally, a network management application. SNMP manager 28 is one example of a network management module. In one example, SNMP manager 28 monitors and controls one or more of managed devices 5 of FIG. 1 and/or managed device 24.

Device 24 may be any device having one or more processors and a memory, and that is capable of executing one or more software processes, including SNMP engine 40, that operates in accordance with a network management protocol, such as SNMP. Device 24 stores objects that represent device 24 resources in a structured form within MIB 44. Each object is identifiable by a unique object identifier. The specific characteristics, or "managed objects," of device 24 typically include resources, parameters, settings, or descriptors for a component, software objects' attributes, system attributes, or global data, for instance. Examples of managed objects include network interfaces of device 24, data describing the relationships between multiple sub-layers of network interfaces, and data describing and providing status information for IEEE 802.3 Medium Attachment Units (MAUs). MIB 44 may be stored in a data repository and may store objects in the form of one or more tables, databases, linked lists, radix trees, or other suitable data structure.

A network operator or other administrator interacts with administrative interface 30 to direct SNMP manager 28 to manage device 24 in a specified manner, e.g., to modify the configuration of device 24 or to monitor the status or performance of device 24, by requesting variable information available from device 24 according to MIB 32. For example, the operator may enter commands to view and modify SNMP data 34 and ultimately to deploy the configuration data to MIB 44 of device 24 as operational configuration data of the device. As another example, the operator may enter commands to retrieve the operational data from MIB 44 of device 24. In another example, SNMP manager 28 may be configured to automatically check the configuration or the status of device 24 or monitor the performance of device 24 at specified times, e.g. once every two minutes or once per month. The status of device 24 may include one of up, down, or warning. When checking the performance of device 24, SNMP manager 28 may retrieve information about network latency, traffic load, errors, central processing unit load, memory usage, and the like.

Control unit 38 of device 24 provides an operating environment for SNMP engine 40, configuration data (CONFIG DATA) 42, and MIB 44. Device 24 stores management data in a structured form, such as MIB 44. Configuration data 42 and MIB 44 may each be stored in a data repository and may each store data in the form of one or more tables, databases, linked lists, radix trees, or other suitable data structure. In some examples, configuration data 42 may be included within MIB 44 and may include tables or other data structures that conform to the structure of MIB 44, thereby minimizing the changes required to implement the techniques of this disclosure and increasing the ease with which the techniques of this disclosure may be deployed. Either or both of configuration data 42 and MIB 44 may store the snmpEngineBoots value. In some examples, configuration data 42 and/or MIB 44 may be stored by a non-volatile memory such that the snmpEngineBoots value is not only stored in a volatile memory of managed device 24, but also in a non-volatile memory.

SNMP engine 40 may operate as a software daemon executing within control unit 38. SNMP engine 40 may establish secure SNMPv3 communications with one or more of network management systems 22 using a set of authentication parameters. The authentication parameters may include an authoritative engine identifier that specifies one or more of the snmpEngineID of the authoritative SNMP engine involved in the exchange of the message, an authoritative engine boots value that specifies the snmpEngineBoots value at the authoritative SNMP engine, an authoritative engine time that specifies the snmpEngineTime value of the authoritative SNMP engine, or a user name that specifies a user on whose behalf the message is being exchange, and may include additional security parameters. Typically, if the snmpEngineBoots value reaches the maximum value, SNMP engine 40 must be physically visited and re-configured, either with a new snmpEngineID value or with new secret values for the authentication and privacy protocols of all users known to that SNMP engine. However, techniques of this disclosure enable re-initialization of the snmpEngineBoots object such that managed device 24 and network management system 22 may maintain secure communications with while using the same authentication parameters.

SNMP engine 40, as shown in FIG. 2, includes recovery module 46. In general, recovery module 46 detects failure conditions and initiates the automatic recovery and notification techniques described in this disclosure. That is, recovery module 46 may determine that one or more failure conditions have occurred and may automatically recover from the failure conditions such that SNMP engine 40 may continue execution of SNMP queries with minimal or no interruption visible to network management system 22. SNMP engine 40 may monitor the values of various objects, including the snmpEngineBoots object and may notify or otherwise cause recovery module 46 to perform the automatic recovery techniques described herein.

Techniques of this disclosure may enable SNMP engine 40 to automatically recover from various instances in which the value of the snmpEngineBoots object causes query failures. In general, SNMP engine 40 may detect a failure condition (e.g., a variable has an invalid value, the variable is set to a maximum value, SNMP engine 40 cannot determine the value of a variable, etc.), may notify one or more of network management system 22 of the failure condition (e.g., using an SNMP trap or inform protocol data unit (PDU)), and initiate an automatic recovery process. As one example, SNMP engine 40 may recover from query failures that occur when the value of the snmpEngineBoots object reaches its maximum value (i.e., 2147483647). As another example, SNMP engine 40 may recover from query failures that occur when SNMP engine 40 is unable to determine the value of snmpEngineBoots object. As yet another example, SNMP engine 40 may recover from query failures that occur when there is corruption of the file that stores the value of the snmpEngineBoots object.

In instances where SNMP engine 40 determines that the snmpEngineBoots object has reached its maximum value, recovery module 46 notifies one or more of network management systems 22 has reached its maximum value using an SNMP trap or inform PDU and automatically resets the value of snmpEngineBoots to a configured initial value, such as 1. For example, recovery module 46 may cause SNMP engine 40 to send a trap PDU to network management system 22A where the trap PDU includes an indication that recovery module 46 initiated an automatic recovery process in response to determining that snmpEngineBoots has reached its maximum value. In resetting the value of the snmpEngineBoots object, recovery module 46 not only resets the value stored in a volatile memory of the managed device, but also writes the reset value to the snmpEngineBoots file that is stored in non-volatile memory of the managed device.

Example psuedocode, which may be executed by recovery module 46 to recover from the failure condition of the snmpEngineBoots object reaching the maximum value follows:

if (snmpEngineBoots greater than or equal to a maximum value) {
    Set snmpEngineBoots value to 1.
    Write the snmpEngineBoots value in non-volatile storage such as file.
    Notify the NMS about this event using a trap or inform message.
    Log this event in syslog.
}

In instances where SNMP engine 40 is unable to determine the value of the snmpEngineBoots object from non-volatile storage (i.e., from the file stored on the non-volatile storage that includes the value the snmpEngineBoots object), recovery module 46 sets the snmpEngineBoots value to 1, notifies one or more of network management systems 22 that SNMP engine 40 is unable to determine the value of the snmpEngineBoots object, and logs this event in a system log. Example psuedocode, which may be executed by recovery module 46 to perform such an operation follows:

if (snmpEngineBoots value cannot be determined from non-volatile storage) {
    Set snmpEngineBoots value to 1.
    Write the snmpEngineBoots value in non-volatile storage such as file.
    Notify the NMS about this event.
    Log this event in a system log.
}

In instances SNMP engine 40 determines that the file used to store the value of the snmpEngineBoots object is corrupted (i.e., the file stored using non-volatile memory), SNMP engine 40 recreates the file on the non-volatile memory, re-initializes the value of the snmpEngineBoots object to the configured initial value, and notifies one or more of network management systems 22 that the file was corrupted. In one example, the file is named "snmp_engine.db" as stores not only the snmpEngineBoots value, but also the snmpEngineID value. As such, when recreating the snmp_engine.db file, recovery module 46 needs to determine the current snmpEngineID value and store the snmpEngineID value and the re-initialized snmpEngineBoots value in snmp_engine.db. Example psuedocode, which may be executed by recovery module 46 to perform such an operation follows:

if (snmp_engine.db is corrupted or cannot be accessed) {
    Recreate snmp_engine.db.
    Set snmpEngineBoots value to 1.
    Set snmpEngineID value.

Write the snmpEngineBoots and snmpEngineID values to snmp_engine.db.
Notify the NMS about this event using trap or inform.
Log this event in syslog.
}

Example psuedocode for implementing all three scenarios follows:

```
#define INT_MAX 2147483647
if ((!snmp_engine_boots)||(snmp_engine_boots>=(INT_MAX-1))||(snmp_engine_db_fp==NULL)) {
    /* Set snmpEngineBoots to 1 */
    snmp_engine_boots=1;
    /* Notify the NMS about this event */
    send_trap(SNMP_TRAP_ENGINE_BOOT_RESET, varbinds);
} else {
    /* Increment snmpEngineBoots value */
    snmp_engine_boots++;
    /* Notify the NMS about this event */
    send_trap(SNMP_TRAP_ENGINE_BOOT_INCREMENTED, varbinds);
}
/* Log this event in daemon's trace */
daemon_trace(&snmpd_dtf_options, SNMP_TRACE_GENERAL, 0, "New snmpEngineBoots: % u", snmp_engine_boots);
/* Log this event in syslog/var/log/messages */
syslog(LOG_INFO, "New snmpEngineBoots: % u", snmp_engine_boots);
/* Update/var/db/snmp_engine.db */snmp_engine_rewrite(snmp_engine_boots, full_engine_id, full_engine_id_length);
```

As part of the notification mechanism, SNMP engine 40 may notify one or more of network management system 40 about any changes in snmpEngineBoots value that result for the automated resetting and re-initialization process described herein. SNMP engine 40 may generate a notification whenever the snmpEngineBoots value is incremented or reset.

The notification mechanism can also be applied for any threshold value of snmpEngineBoots. For example, administrator 12 of FIG. 1 can configure the threshold value for snmpEngineBoots on SNMP engine 40 and configure SNMP engine 40 such that a trap PDU or an inform PDU is generated whenever snmpEngineBoots reaches the threshold value. In this way, SNMP engine 40 may be configured to help network administrators identify instances where SNMP engine 40 is getting rebooted and/or re-initialized frequently or if there are any discrepancies in the snmpEngineBoots value (e.g., due to file corruption).

Figure 3:
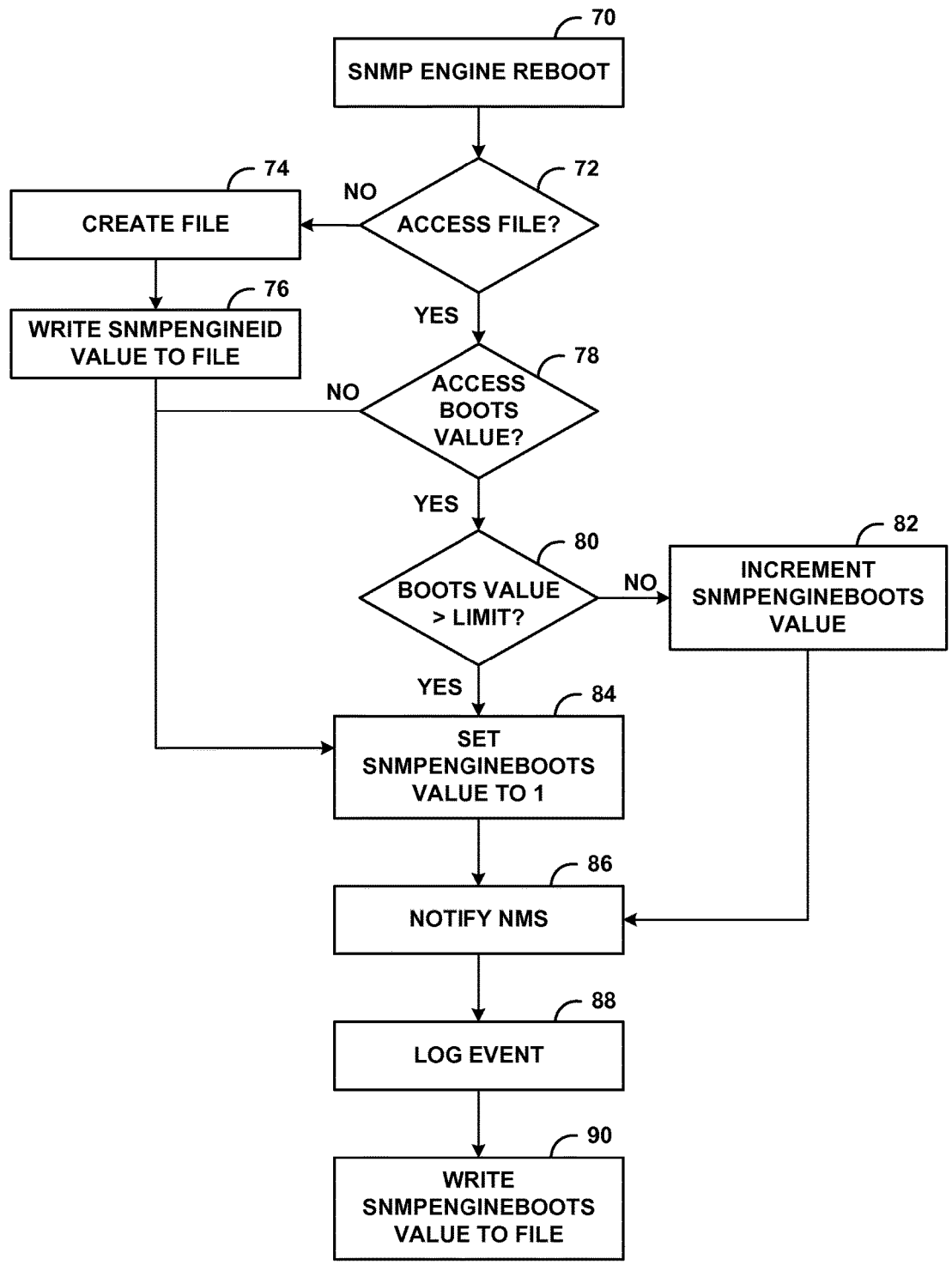
FIG. 3 is a flow chart illustrating an example technique for automated resetting and notification for an SNMP engine variable, in accordance with techniques of this disclosure.

FIG. 3 is a flow chart illustrating an example technique for automated resetting and notification for an SNMP engine variable, in accordance with techniques of this disclosure. The example operation of FIG. 3 is described with respect to example network 2 of FIG. 1 and network management system 22A and managed device 24 of FIG. 2.

SNMP engine 40 reboots, is re-initialized, or otherwise begins executing on managed device 24 (70) and establishes secure SNMPv3 communication with network management system 22 using a set of authentication parameters. In establishing the secure SNMPv3 communication, SNMP engine 40 determines if the file that stores the value of the snmpEngineBoots object is accessible (72). For example, SNMP engine 40 may attempt to read the file from a non-volatile storage device. In some examples, the file is named "snmp_engine.db". The file may store the value of the snmpEngineBoots object as well as the value of the snmpEngineID object. If SNMP engine 40 determines that the file is not accessible (e.g., is corrupted, does not exist, or is otherwise inaccessible) ("NO" branch of 72), recovery module 46 of SNMP engine 40 may automatically create the file (74) and write the value of the snmpEngineID object to the file (76). Recovery module 46 may obtain the value of the snmpEngineID object from a volatile memory of managed device 24, from configuration information stored in configuration data 42, or from network management system 22A (e.g., as provided by administrator 12 of FIG. 1). Recovery module 46 may also re-initialize the value of the snmpEngineBoots object to a configured initial value, such as 1 (84).

If SNMP engine 40 determines that the file is accessible ("YES" branch of 72), SNMP engine 40 determines whether the snmpEngineBoots value is accessible or otherwise available (78). For example, SNMP engine 40 may attempt to read the snmpEngineBoots value from the file. If SNMP engine 40 determines that the snmpEngineBoots value is not accessible ("NO" branch of 78), recovery module 46 may automatically re-initialize the value of the snmpEngineBoots object to a configured initial value, such as 1 (84).

If SNMP engine 40 determines that the snmpEngineBoots value is accessible ("YES") branch of 78, SNMP engine 40 determines whether the value of the snmpEngineBoots object is greater than or equal to a maximum allowed value for the snmpEngineBoots object (80). The maximum allowed value may be the value specified by one of RFCs 2574 or 3414, such as 2147483647, or a maximum value configured by an administrator (e.g., administrator 12 of FIG. 1). If SNMP engine 40 determines that the value of the snmpEngineBoots object is less than the maximum value ("NO" branch of 80), SNMP engine 40 increments the value of the snmpEngineBoots object (82), notifies network management system 22A that the value was incremented (86), logs the event (88), and stores the updated value in the snmp_engine.db file (90). If SNMP engine 40 determines that the value of the snmpEngineBoots object is greater than or equal to the maximum value ("YES" branch of 80), recovery module 46 automatically re-initializes the value of the snmpEngineBoots object to a configured initial value, such as 1 (84).

Regardless of whether the file was accessible, the value of the snmpEngineBoots object was accessible, or whether the value of the snmpEngineBoots object was less than the maximum value, SNMP engine 40 notifies network management system 22A of the event (86). That is, SNMP engine 40 may send a trap PDU or an inform PDU that includes an indication of the event (e.g., the snmpEngineBoots value was incremented, the snmpEngineBoots file was recreated, snmpEngineBoots value was re-initialized, etc.) that triggered the trap or inform PDU to be sent to network management system 22A. SNMP engine 40 may also log the event in a system log of managed device 24 and/or using a daemon trace function of SNMP engine 40 (88). SNMP engine 40 also writes the updated value of the snmpEngineBoots object to the file (90) such that the value is stored in a non-volatile memory. This process or a portion thereof may repeat each time SNMP engine 40 reboots or any time SNMP engine 40 determines that the snmp_engine.db file is corrupted, the value of the snmpEngineBoots object is not accessible, or the value of the snmpEngineBoots object is greater than or equal to the maximum value. In this way, even if the snmpEngineBoots objects needs to be re-initialized, SNMP engine 40 may maintain secure communication with network management system 22A using the same set of authentication parameters such that managed device 24 and network management system 22A may engage in uninterrupted execution of SNMPv3 queries.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
    establishing, by a simple network management protocol engine executing at a managed device and based on a set of authentication parameters, secure simple networking management protocol communication with a network management system;
    during the secure simple networking management communication, performing, by the simple network management protocol engine and using a variable value, replay protection on packets received during the secure simple networking management protocol communication;
    determining, by the simple network management protocol engine, whether a file is corrupted;
    determining, by the simple network management protocol engine, whether the variable value stored in the file is readable;
    determining, by the simple network management protocol engine, whether the variable value is greater than or equal to a maximum value; and
    responsive to determining that the file is corrupted, that the variable value is not readable, or that the variable value is greater than or equal to the maximum value:
        re-initializing the variable value; and
        maintaining the secure simple networking management protocol communication with network management system using the set of authentication parameters and the re-initialized variable value.

2. The method of claim 1, further comprising:
responsive to determining that the file is corrupted:
    recreating, by the simple network management protocol engine, the file in a non-volatile storage of the managed device; and
    storing, by the simple network management protocol engine, a unique identifier for the simple network management protocol engine in the file.

3. The method of claim 1, further comprising:
responsive to determining that a variable value stored in the file is not readable:
    re-initializing, by the simple network management protocol engine, the variable value to a configured initial value; and
    storing, by the simple network management protocol engine, the variable value in the file.

4. The method of claim 1, further comprising:
responsive to determining that the file is corrupted, that the variable value is not readable, or that the variable value is greater than or equal to the maximum value:
    generating, by the simple network management protocol engine, one of a trap message or inform message as a notification message, wherein the notification message includes an indication that the variable value was re-initialized; and
    sending, by the simple network management protocol engine, the notification message to the network management system.

5. The method of claim 1, further comprising:
responsive to determining that the file is corrupted, that the variable value is not readable, or that the variable value is greater than or equal to the maximum value, storing, by the simple network management protocol engine, an indication of at least one of whether the file is corrupted, whether the variable value is readable, or whether the variable value is greater than or equal to the maximum value.

6. The method of claim 1, further comprising:
responsive to determining that the file is not corrupted, that the variable value is readable, and that the variable value is less than the maximum value:
    incrementing, by the simple network management protocol engine, the variable value; and
    storing, by the simple network management protocol engine, the variable value in the file.

7. The method of claim 1, wherein the set of authentication parameters includes an identifier that uniquely identifies the simple network management protocol engine and a user name.

8. The method of claim 1, wherein the variable value is a value of an snmpEngineBoots object.

9. The method of claim 1, wherein the simple network management protocol engine operates in accordance with version three of the simple network management protocol.

10. The method of claim 1, wherein performing replay protection comprises:
determining, by the simple network management protocol engine and based on the variable value, whether the simple network management protocol engine has already received one of the packets; and
responsive to determining that the simple network management protocol engine has already received the one of the packets, dropping the one of the packets.

11. A managed network device comprising:
a storage medium configured to store a file that includes a variable value; and
a control unit that provides an execution environment for a simple network management protocol engine, wherein the simple network management protocol engine is operable by the control unit to:
establish, based on a set of authentication parameters, secure simple networking management protocol communication with a network management system,
during the secure simple networking management communication, perform, using a variable value, replay protection on packets received during the secure simple networking management protocol communication,
determine whether the file is corrupted, determine whether the variable value stored in the file is readable,
determine whether the variable value is greater than or equal to a maximum value, and
responsive to determining that the file is corrupted, that the variable value is not readable, or that the variable value is greater than or equal to the maximum value:
re-initialize the variable value, and
maintain the secure simple networking management protocol communication with network management system using the set of authentication parameters and the re-initialized variable value.

12. The managed network device of claim 11, wherein the simple network management protocol engine is operable by the control unit to, responsive to determining that the file is corrupted: recreate the file in the storage medium, and store a unique identifier for the simple network management protocol engine in the file.

13. The managed network device of claim 11, wherein the simple network management protocol engine is operable by the control unit to, responsive to determining that a variable value stored in the file is not readable: re-initialize the variable value to a configured initial value, and store the variable value in the file.

14. The managed network device of claim 11, wherein the simple network management protocol engine is operable by the control unit to, responsive to determining that the file is corrupted, that the variable value is not readable, or that the variable value is greater than or equal to the maximum value: generate one of a trap message or inform message as a notification message, wherein the notification message includes an indication that the variable value was re-initialized, and send the notification message to the network management system.

15. The managed network device of claim 11, wherein the simple network management protocol engine is operable by the control unit to, responsive to determining that the file is corrupted, that the variable value is not readable, or that the variable value is greater than or equal to the maximum value: store an indication of at least one of whether the file is corrupted, whether the variable value is readable, or whether the variable value is greater than or equal to the maximum value.

16. The managed network device of claim 11, wherein the simple network management protocol engine is operable by the control unit to, responsive to determining that the file is not corrupted, that the variable value is readable, and that the variable value is less than the maximum value: increment the variable value, and store the variable value in the file.

17. The managed device of claim 11, wherein the set of authentication parameters includes an identifier that uniquely identifies the simple network management protocol engine and a user name.

18. The managed network device of claim 11, wherein the simple network management protocol engine is operable by the control unit to perform replay protection by at least being operable to:
determine, based on the variable value, whether the simple network management protocol engine has already received one of the packets; and
responsive to determining that the simple network management protocol engine has already received the one of the packets, drop the one of the packets.

19. A non-transitory computer-readable storage medium encoded with instructions that cause one or more processors of a managed network device to:
establish, based on a set of authentication parameters, secure simple networking management protocol communication with a network management system;
during the secure simple networking management communication, perform, using a variable value, replay protection on packets received during the secure simple networking management protocol communication;
determine whether a file is corrupted;
determine whether a value of an snmpEngineBoots object stored in the file is readable;
determine whether the value of the snmpEngineBoots object is greater than or equal to a maximum value; and
responsive to determining that the file is corrupted, that the value of the snmpEngineBoots object is not readable, or that the value of the snmpEngineBoots object is greater than or equal to the maximum value:
re-initialize the value of the snmpEngineBoots; and
maintain the secure simple networking management protocol communication with network management system using the set of authentication parameters and the re-initialized variable value.

20. The non-transitory computer-readable storage medium of claim 19, wherein the instructions further cause the one or more processors to:
responsive to determining that the file is corrupted, that the variable value is not readable, or that the variable value is greater than or equal to the maximum value:
generate one of a trap message or inform message as a notification message, wherein the notification message includes an indication that the value of the snmpEngineBoots object was re-initialized; and
send the notification message to the network management system.

* * * * *